United States Patent
Malik

(10) Patent No.: US 6,907,452 B1
(45) Date of Patent: Jun. 14, 2005

(54) METHOD AND APPARATUS FOR ATTACHING VIEWER APPLETS TO ELECTRONIC MAIL COMMUNICATIONS

(75) Inventor: Dale W. Malik, Dunwoody, GA (US)

(73) Assignee: BellSouth Intellectual Property Corporation, Wilmington, DE (US)

(*) Notice: Subject to any disclaimer, the term of this patent is extended or adjusted under 35 U.S.C. 154(b) by 0 days.

(21) Appl. No.: 09/563,929

(22) Filed: May 4, 2000

(51) Int. Cl.[7] .............................. G06F 15/16; G06F 5/00
(52) U.S. Cl. ....................... 709/206; 345/752; 345/809
(58) Field of Search ................................ 709/203, 207, 709/218, 219, 231, 206

(56) References Cited

U.S. PATENT DOCUMENTS

| | | | | |
|---|---|---|---|---|
| 5,771,355 A | * | 6/1998 | Kuzma | 709/206 |
| 5,875,335 A | * | 2/1999 | Beard | 717/139 |
| 6,256,666 B1 | * | 7/2001 | Singhal | 709/217 |
| 6,304,898 B1 | * | 10/2001 | Shiigi | 709/206 |
| 6,625,642 B1 | * | 9/2003 | Naylor et al. | 709/206 |
| 6,721,784 B1 | * | 4/2004 | Leonard et al. | 709/206 |
| 6,785,867 B2 | * | 8/2004 | Shaffer et al. | 715/516 |

OTHER PUBLICATIONS

Using SIMEON E–mail on PC Caledonia, G.J. Mulvenna, Aug. 1998, pp. 1–12 and 1–83.*
Digital Toolbox, Thomas, Brian, IEEE Internet Computing, May–Jun. 1997, pp. 97–99.*
Easy Microsoft Outlook 97, Fulton, J. QUE® Corp. 1997, pp. 50–51, and 70–77.*

* cited by examiner

Primary Examiner—Beatriz Prieto
(74) Attorney, Agent, or Firm—Thomas, Kayden, Horstemeyer & Risley, LLP

(57) ABSTRACT

The present invention is directed to a method and system for configuring an e-mail communication by including viewer applets corresponding to attached files in e-mail communications. A viewer module attaches a corresponding viewer applet for an attachment file. One or more viewer applets can be associated with a package of e-mail attachment files as the attachment files are designated from within user applications. A delayed delivery module transmits the viewer applet to an intermediate location, separately from the e-mail communication, where it is stored until requested by a recipient of the e-mail communication.

45 Claims, 8 Drawing Sheets

Figure 5
Figure 5a
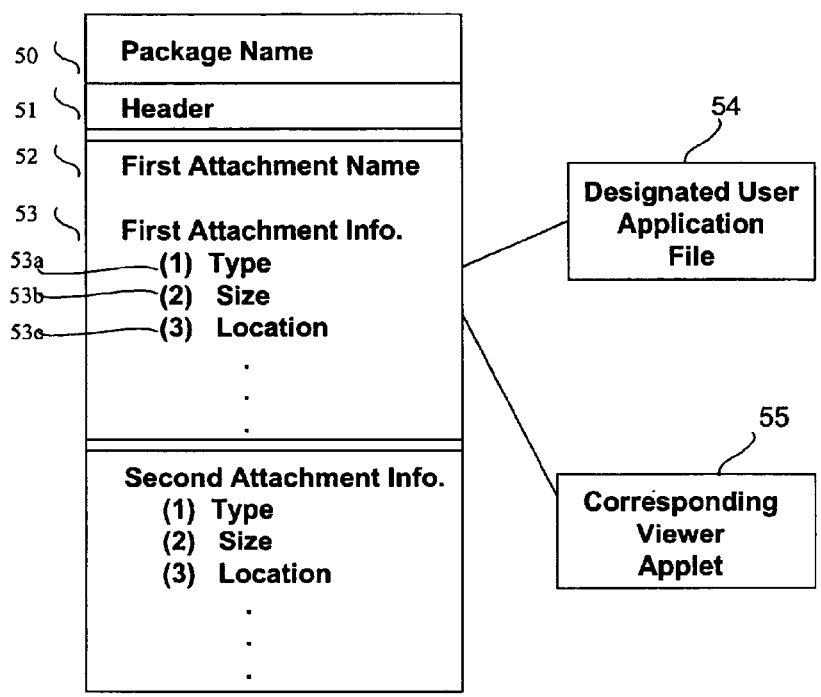
Figure 5b
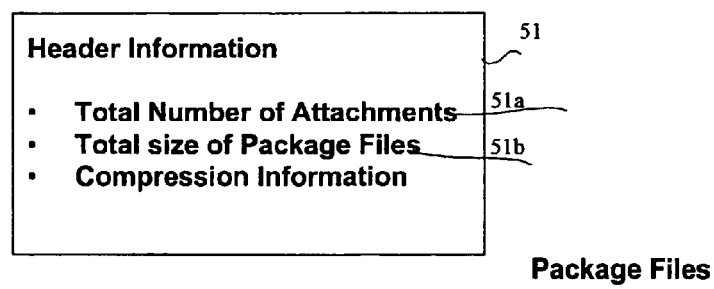

METHOD AND APPARATUS FOR ATTACHING VIEWER APPLETS TO ELECTRONIC MAIL COMMUNICATIONS

FIELD OF THE INVENTION

The present invention relates to the transmission of electronic mail over computer networks, and more particularly, to the transmission of viewer applets attached to electronic mail communications for viewing attachment files in the electronic mail communications.

DESCRIPTION OF THE RELATED ART

During the past decade, electronic mail ("e-mail") has become an indispensable tool for facilitating business and personal communications. Through computer networking systems such as local-area networks ("LAN"), wide-area networks ("WAN"), and the world-wide web ("WWW"), network users can send and receive notes, messages, letters, etc., to communicate with others who are in the same office or perhaps in remote locations across the world.

Most e-mail application programs allow a user to attach a file to be sent along with a message as an attachment. Attachment files might include word processing documents, graphics files, audio or video, multimedia presentation files, computer-aided drawing ("CAD") files, mathematical equation editor files, spreadsheet reports, etc. A recipient will receive the e-mail message plus any attached files, which may then be opened if the recipient's computer has the appropriate application software. In many applications, it is preferable to send documents through e-mail attachments instead of a facsimile because the recipient can then print an exact replica of the original file. For long-distance communications, it is also less costly to send documents via e-mail as compared with a facsimile.

Although many currently available e-mail application programs enable a user to send attachments as part of an e-mail communication, there are problems that recipients often encounter when receiving e-mail attachment files. If a recipient's computer does not have the particular user application software that corresponds with the attachment file, the recipient will not be able to access the attachment. For example, if a sender attaches a CAD document created with CAD software for transmission in an e-mail communication, the recipient might not be able to access or view the file unless the recipient has installed the same CAD software as in the sender's computer. Considering the number of different software vendors that a supply software for word processing, graphing, drawing, video editing, CAD, etc., it can be quite common for a recipient to be unable to open an attached document in an e-mail communication. Even if the recipient's computer system supports a particular vendor's software, the recipient might still not be able to access or view the file if the transmitted document was created on a more recent version of this software. In order to view the document, the recipient must then request the sender to save the attachment file in a different format that is compatible with the recipient's software and re-transmit the e-mail communication.

Some e-mail application programs include "quick viewer" features for the recipient of an e-mail attachment file to view the file. These e-mail application programs store viewer applets for many of the popular software packages that are commonly used. The viewer applets are executable files that allow the recipient to view, but not open or edit, a file that was received, when a user selects the received file. While the "quick viewer" feature may allow the recipient to view the majority of transmitted files, there may still be file types that are not supported by the viewer. Particularly, the "quick viewer" may not support specialty software that does not have widespread use. Even with widely-used software packages, the documents composed with the newest version of the software may not be accessible by the "quick viewer" when new versions or upgrades of a software vendor are released. Because of the number of different software packages that are commonly available, it would be impractical to install an upgrade of the e-mail application program each time a commonly-used software package is upgraded.

These problems significantly reduce the benefits of e-mail systems and may negatively affect both the sender's and recipient's productivity when engaging in electronic mail communications.

SUMMARY OF THE INVENTION

In view of the difficulties encountered with viewing attachments to e-mail communications described above, there is a need for a method and apparatus for configuring an e-mail communication to include viewer applets with the transmission of desired attachment files.

The present invention provides a method for attaching viewer applets to e-mail communications. A selection of at least one file to be included as an attachment to an e-mail communication is received. A corresponding viewer applet is attached for at least one selected file to the e-mail communication. A prompt can be generated for the sender to select whether to include a viewer applet with the e-mail communication.

The present invention also provides an e-mail communications system for attaching viewer applets to e-mail communications. E-mail communications that include at least one attachment file are composed on a user interface. A viewer module attaches a corresponding viewer applet for at least one attachment file.

The present invention further provides a method for configuring packages of e-mail attachment files for transmission as e-mail communications. A plurality of data structures are created, wherein each data structure groups together a plurality of different user application files designated as attachments to an e-mail communication. Application files designated from within user applications are associated with selected data structures, such that each designated application file is associated with a selected data structure. Viewer applets corresponding to selected files are attached.

The present invention further provides a system for configuring packages of e-mail attachment files for transmission as e-mail communications. The system includes a plurality of data structures, in which each data structure groups together a plurality of different user application files designated as attachments to an e-mail communication. A packaging file manager designates user application files from within respective user applications to selected data structures, such that each designated application file is associated with a selected data structure. A viewer module attaches corresponding viewer applets for the designated attachment files. An e-mail application user interface provides a listing of the data structures containing user application files generated by the packaging file manager during composition of an e-mail communication having attachments.

The present invention additionally provides a method for transmitting a viewer applet corresponding to an attachment to an e-mail communication. An e-mail communication including at least one attachment to a destination e-mail address is transmitted. A viewer applet corresponding to the at least one attachment is then transmitted to an intermediate location along a network. The viewer applet is temporarily stored at the intermediate location. Transmission of the viewer applet is completed in response to a request signal.

BRIEF DESCRIPTION OF THE DRAWINGS

FIG. 5a is a schematic of a data structure representation of a package of attachment files according to the second embodiment of the present invention.

FIG. 5b is a schematic of a data structure representation of a header information field in FIG. 5a according to the second embodiment of the present invention.

DETAILED DESCRIPTION OF PREFERRED EMBODIMENTS OF THE INVENTION

Figure 1:
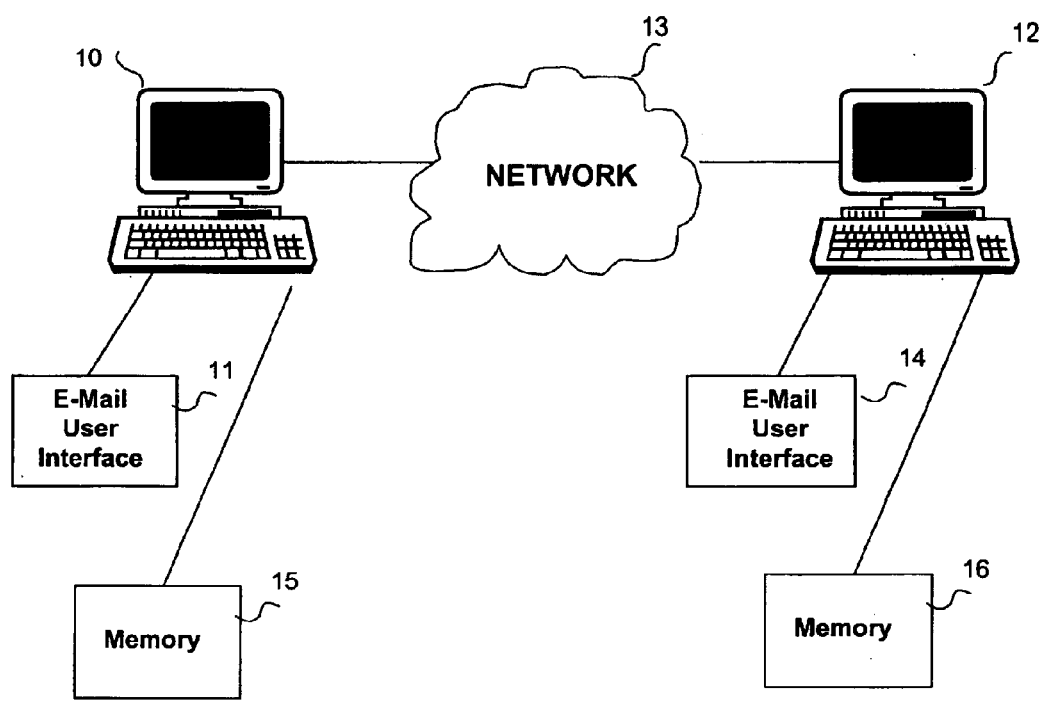
FIG. 1 is a schematic diagram of a basic computer network system according to the present invention.

The present invention will now be described in more detail with reference to the figures. FIG. 1 is a schematic diagram of a basic computer network system, in which computer 10 is connected to computer 12 through a network 13 to facilitate e-mail communications with attachments. Computer 10 has an e-mail communications user interface 11 that permits the computer to send e-mail communications using network 13. Likewise, computer 12 has an e-mail communications user interface 14 that permits the computer to receive e-mail communications from network 13. The term computer in this description is not limited to any particular type of computer, and may include computer systems having many computers, or only a portion of a computer. Network 13 can be in the form of a wired network or a wireless network. The network may be a simple, single communication path, or it may include one or several LANs or WANs, the world wide web, or any combination thereof. Computers 10 and 12 may be the only computers connected to the network 13, or the network may be shared by many other computers. Computers 10 and 12 additionally include memories 15 and 16, respectively, for storing a plurality of user applications, which may or may not include software packages for word processing, CAD, mathematical equation editing, video editing, graphics, multimedia presentations, etc.

Figure 2:
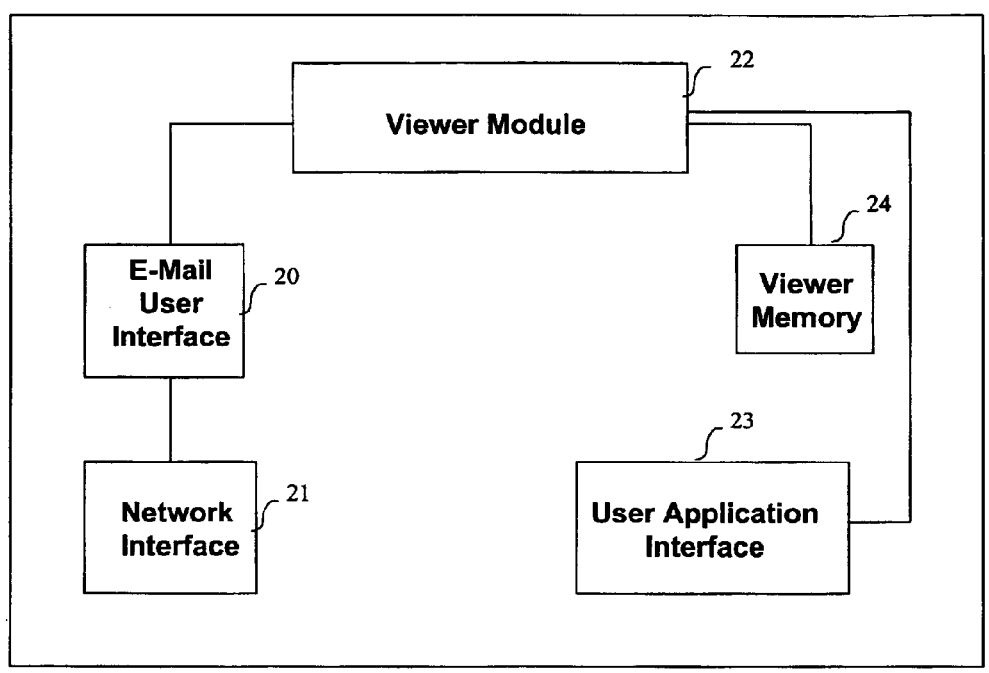
FIG. 2 is a schematic diagram of an e-mail communications system according to the present invention.

The present invention is directed to a system and method for selectively attaching viewer applets to e-mail communications when it is likely that the recipient of the e-mail communication will not be able to open or view an attachment file that is to be sent in the e-mail. As shown in FIG. 2, an e-mail communications system according to the present invention includes an e-mail user interface 20 by which a user composes e-mail communications. A network interface 21 is connected to the user interface for transmitting and receiving e-mail communications, and for transmitting or receiving viewer applets used for viewing attachment files. E-mail user interface 20 is also connected to viewer module 22. As will be explained below, viewer module 22 controls the placement and transmission of viewer applets in outgoing e-mail communications, and enables a user to view attachment files in incoming e-mail communications. Viewer module 22 is connected to the user application interface 23 to receive viewer applets from other user application software packages that are installed on the user's computer system. Viewer memory 24 stores viewers for commonly-used user applications.

Figure 3:
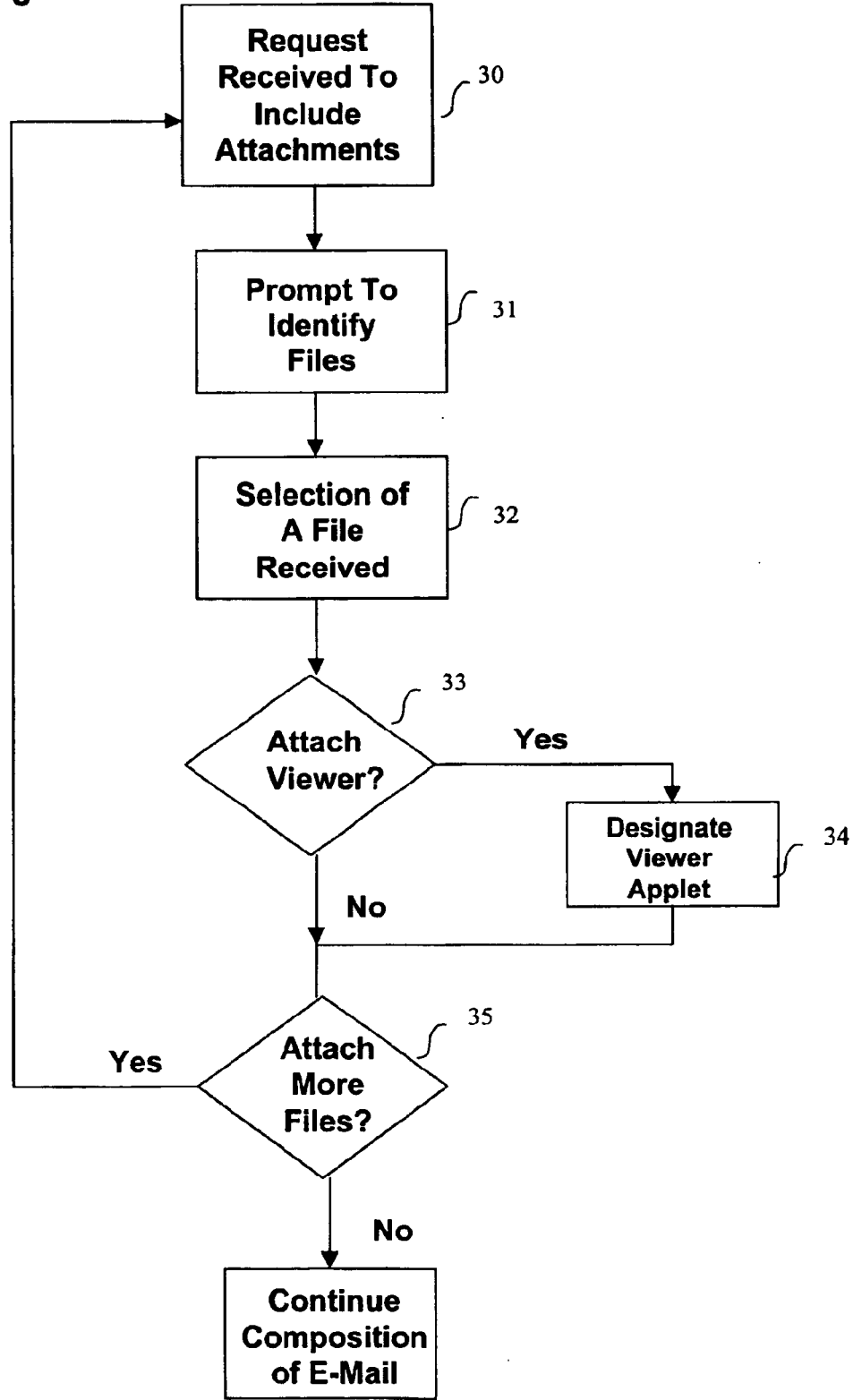
FIG. 3 is a flow diagram for attaching viewer applets to an e-mail communication according to a first embodiment of the present invention.

In a first embodiment of the present invention, the viewer module 22 of FIG. 2 attaches a viewer applet corresponding to an attachment file during the assembly of an e-mail communication. The flow diagram in FIG. 3 is an example of the steps that could be used to implement this embodiment. When a user elects to include an attachment with an e-mail communication, a signal is sent to the viewer module, as shown in step 30. A menu prompt is provided in step 31 to select one or more files to attach to the e-mail communication. The menu prompt of step 31 is generated in the user-interface 20 shown in FIG. 2. It allows the user to access file information maintained in a document management system in either the e-mail communications system itself, the computer's operating system, or on the network to which the user's computer is attached.

Once a file is selected to be an attachment in step 32, the viewer module 22 determines whether to add the viewer applet that corresponds with the attachment file, in step 33. The viewer module can be configured for several possible modes of operation. In one mode of operation, viewer module 22 always adds the corresponding viewer applet to the e-mail communication. The principal advantage of this mode is that it provides the highest degree of certainty that any recipient should be able to view attachments from the sender, although on many occasions the recipient would otherwise be able to view these files. In a second mode of operation, the sender is prompted to elect whether to include a viewer applet corresponding to the selected attachment. This mode allows the sender to avoid unnecessarily sending the viewer applet when the sender knows that the recipient's computer is capable of displaying the file.

In a third mode of operation, the viewer module prompts the sender to include a viewer applet only when it is likely that the recipient does not have the corresponding viewer applet or application software. This can be performed by referring to a list of file types stored in the viewer memory 24, and only prompting the sender to send a viewer applet when the selected attachment file type is not among those in the list. Another method is to generate the prompt when the sender's own e-mail communication system would not be able to view the attachment. That is, a prompt is generated when the viewer software stored in viewer memory 24 does not include a component for viewing the attached file.

If the sender elects to include a viewer applet, the viewer applet is added to the e-mail communication for transmission to the recipient, in step 34. The viewer applet may be copied from the application software package by which the attachment file was created, through application interface 23 in FIG. 2. It is also possible that the sender's computer has third party viewer software, from which a component corresponding to the relevant application software is then extracted and attached to the e-mail.

This process is repeated until the sender indicates that there are no more attachment files to be selected, in step 35. The sender can then continue to compose the e-mail communication in the normal course.

In a second embodiment, the viewer module is incorporated into a system that allows the user to configure groups of application files attached to an e-mail communication as packages. In this system, the user can designate a file to be a part of a new or an existing package of application files from within the user application software. The packages of application files, as defined by the user, can then be included as an e-mail attachment in a future e-mail communication. At the time when the user designates a file to be an attachment, the viewer module determines whether to include a viewer applet in the e-mail communication by the same modes of operation disclosed with respect to FIG. 3.

Figure 4:
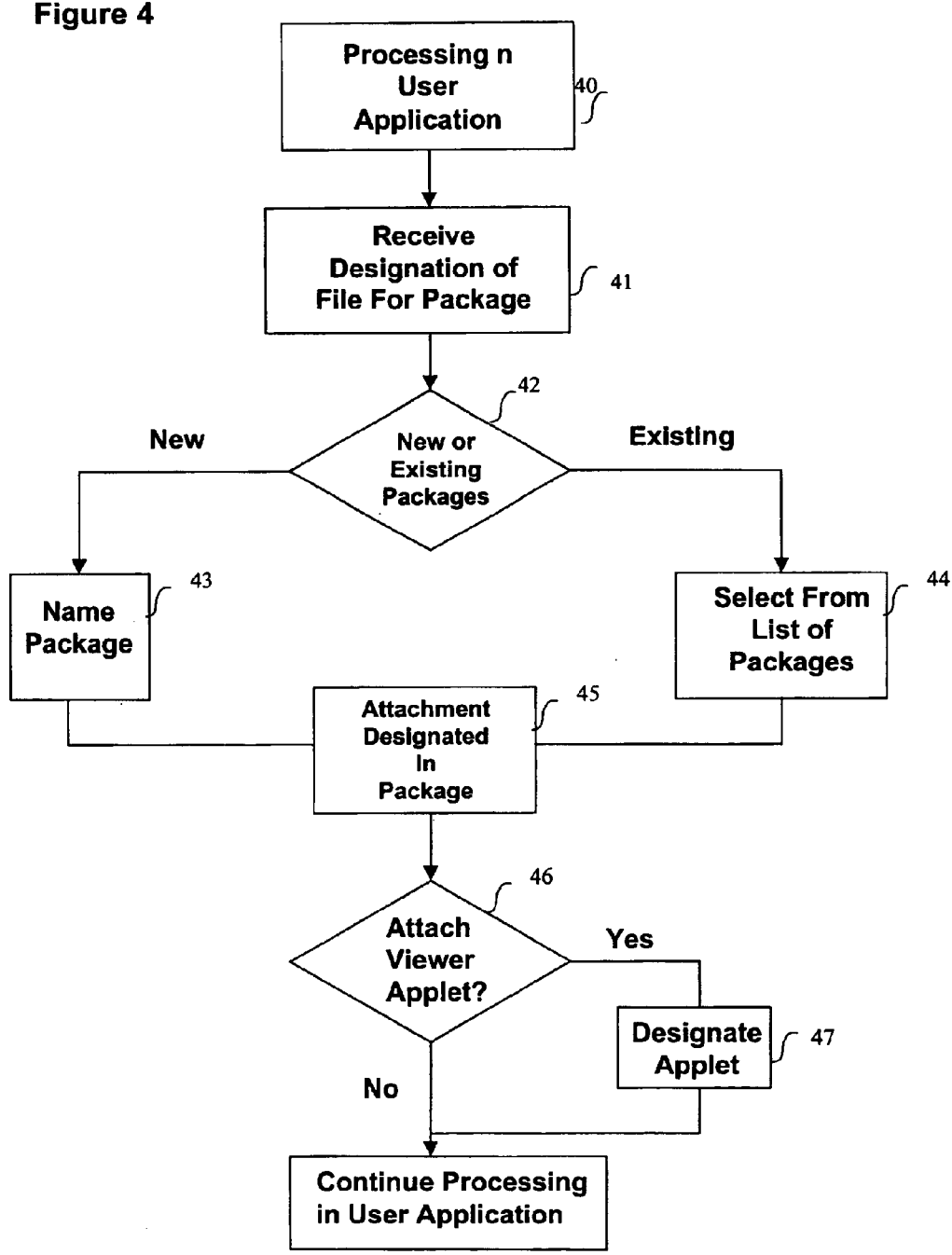
FIG. 4 is a flow diagram for configuring packages of attachment files with corresponding viewer applets according to a second embodiment of the present invention

FIG. 4 provides a flow diagram illustrating how the e-mail application interfaces with a user application to coordinate the composition of packages of designated files for attachments and the attachment of viewer applets. A user opens a user application, as in step 40, and begins to process an application file in the normal course. In this context, processing may include creating a new file, or opening and editing an existing file. The application files may be in a text format or any graphics, audio/video, or multimedia-type format. Graphics files might include jpeg, tif, or gif files. At any time during processing of the file, the user may choose to designate the application file for a package, as in step 41. This may be done by selecting an icon that is overlaid onto the screen of the user application. Alternatively, the user application itself may incorporate a macro within its menu or in its "toolbar" for creating e-mail attachment packages.

The user is then prompted to select an appropriate package for the designated file, in step 42. As one option, the user may choose to create a new package. If so, the system prompts the user to identify a package name, in step 43. Optionally, the system may create an icon that is to be associated with the package. If the user wishes to add the attachment file to an existing package, the system prompts the user to select from a list of packages, by name or by icon, or to provide the desired package name, in step 44. In step 45, the user application file is now designated as an attachment for a particularly defined package.

When an application file is designated as an attachment, the viewer module 22 in FIG. 2 determines whether to add the viewer applet that corresponds with the attachment file, as in step 33 of FIG. 3. The step of determining whether to attach a viewer applet in step 46 of FIG. 4 can be automatic, user-selected, or a combination of the two, as explained above. If a viewer applet is to be included into the e-mail communication, the applet is designated as another attachment for the defined package in step 47.

When an application file is designated as an attachment, a pointer or link is then associated between the application file and a data structure for the package, as illustrated with reference to FIGS. 5a and 5b. As shown in FIG. 5a, the data structure contains the package name 50 defined to identify the package. As shown in FIG. 5b, the header information 51 stores information about the package itself, which may include the number of attachment files currently associated with the package 51a, the total size of the combination of attachment files 51b, and information regarding the capabilities for compressing the file. For each file designated as an attachment and associated with the package, the data structure includes the user-defined attachment name 52, and general attachment file information 53, including the file type 53a, file size 53b, file location 53c, etc. A pointer or link from the attachment information 53 to the user application file 54 is maintained. If the corresponding viewer applet is to be included, another pointer or link to the viewer applet 55 is maintained.

Figure 6:
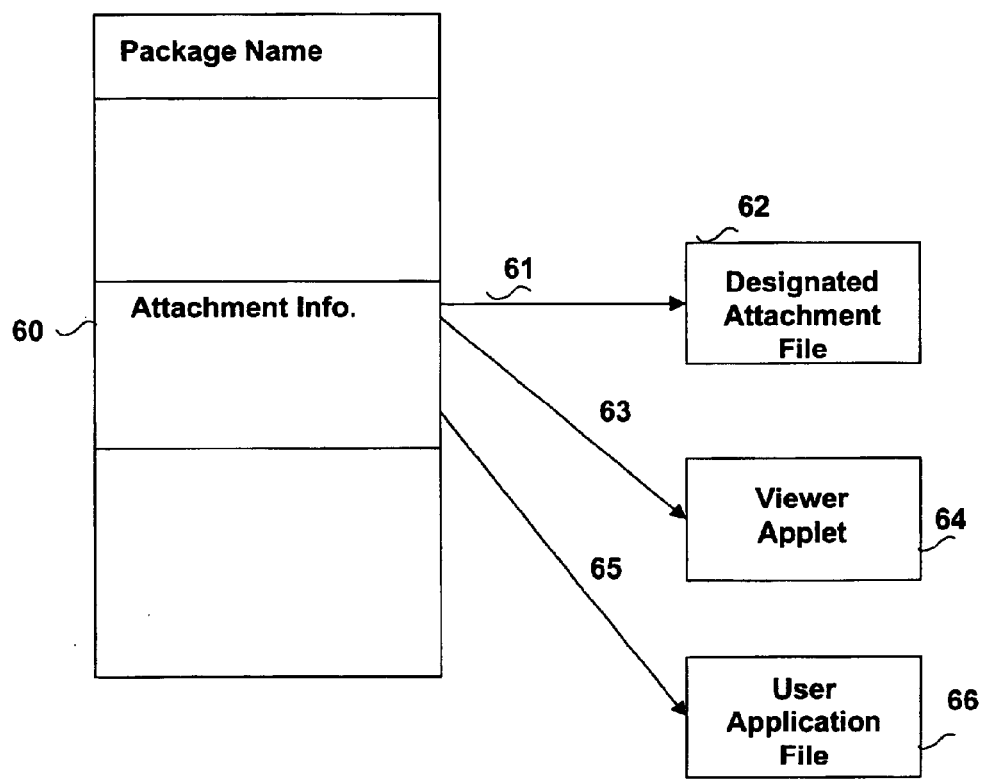
FIG. 6 is a schematic of a data structure representation of a package of attachment files according to the second embodiment of the present invention.

In an alternative embodiment, a copy of the user application file is made and stored as a separate file. In this data structure, shown in FIG. 6, the attachment information portion 60 maintains a link or pointer 61 to a new copy of the user application file, stored as designated attachment 62, and another link or pointer 63 to a copy of the corresponding viewer applet 64. In this embodiment, when a user application file is designated as an attachment, a copy is made of the user application file in its current form. Any subsequent edits to the user application after the user designates the file in a package are not automatically incorporated into the attachment file. However, because the user may desire to transmit the latest version of the user application, a second pointer is also maintained 65 to the user application file 66. When the user enters the e-mail application and requests to include a particular package as an attachment, the system can detect whether the user application file 66 has changed from the designated attachment 62, and the user can choose which file to include in the package. Although it is more cumbersome to store a separate copy of the user application file to be attached, this embodiment provides additional functionality for the user.

As a third embodiment, the present invention further includes an attachment delayed-delivery module that temporarily suspends delivery of the viewer applet attachment at the sender's e-mail post office, or server, until the viewer is requested by the recipient. If the viewer applet attachment is not requested within a predetermined or user-selected time limit, e.g., one week, the viewer applet is deleted from the sender's post office. The attachment delayed-delivery module allows a recipient's e-mail communications system to automatically request transmission of the viewer applet over the network when necessary to view an attachment in an e-mail communication. When the viewer applet is not necessary for the recipient, the attachment delayed-delivery module reduces unnecessary traffic over the network.

Figure 7:
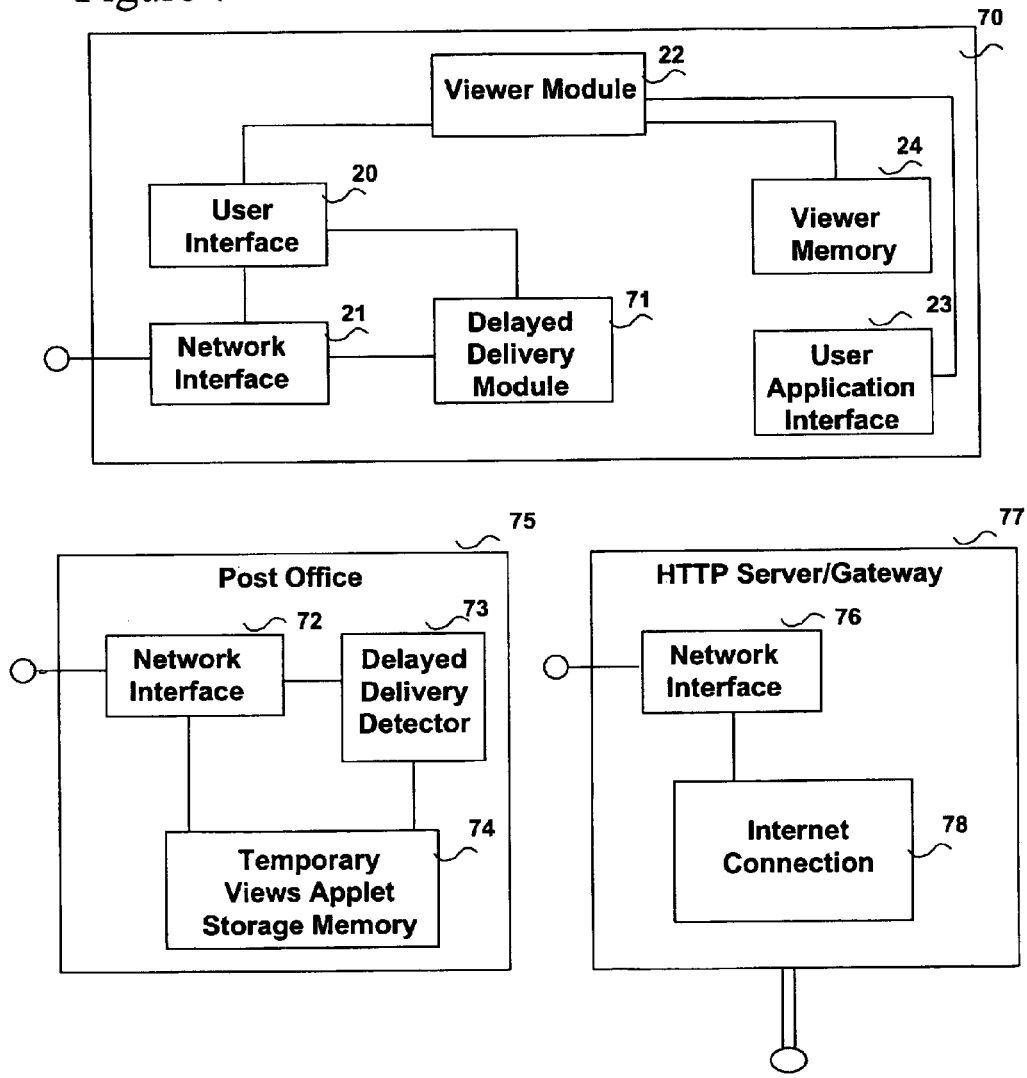
FIG. 7 is a schematic of an e-mail communications system with a delayed delivery module according to a third embodiment of the present invention

The configuration of an e-mail communications system incorporating an attachment delayed-delivery module is explained with reference to FIG. 7. The e-mail communications system 70 includes the user interface 20, network interface 21, viewer module 22, viewer memory 24, and user application interface 23, as shown in FIG. 2 above. The system 70 also includes a delayed delivery module 71, connected to the user interface 20 and the network interface 21, in order to send viewer applet attachments in separate e-mails that are transmitted to the recipient only upon request by the recipient.

Through network interface 21, delayed delivery module 71 transmits attachments of viewer applets to post office 75. This is received by network interface 72, detected by delayed delivery detector 73, and temporarily stored in temporary memory 74. If the destination address provided with the e-mail communication is for an e-mail external to the network, to be transmitted via the internet, the original e-mail communication including the attachment is forwarded from the post office 75 to the http server/gateway 77, through network interface 76, and on to the internet connection 78.

Figure 8:
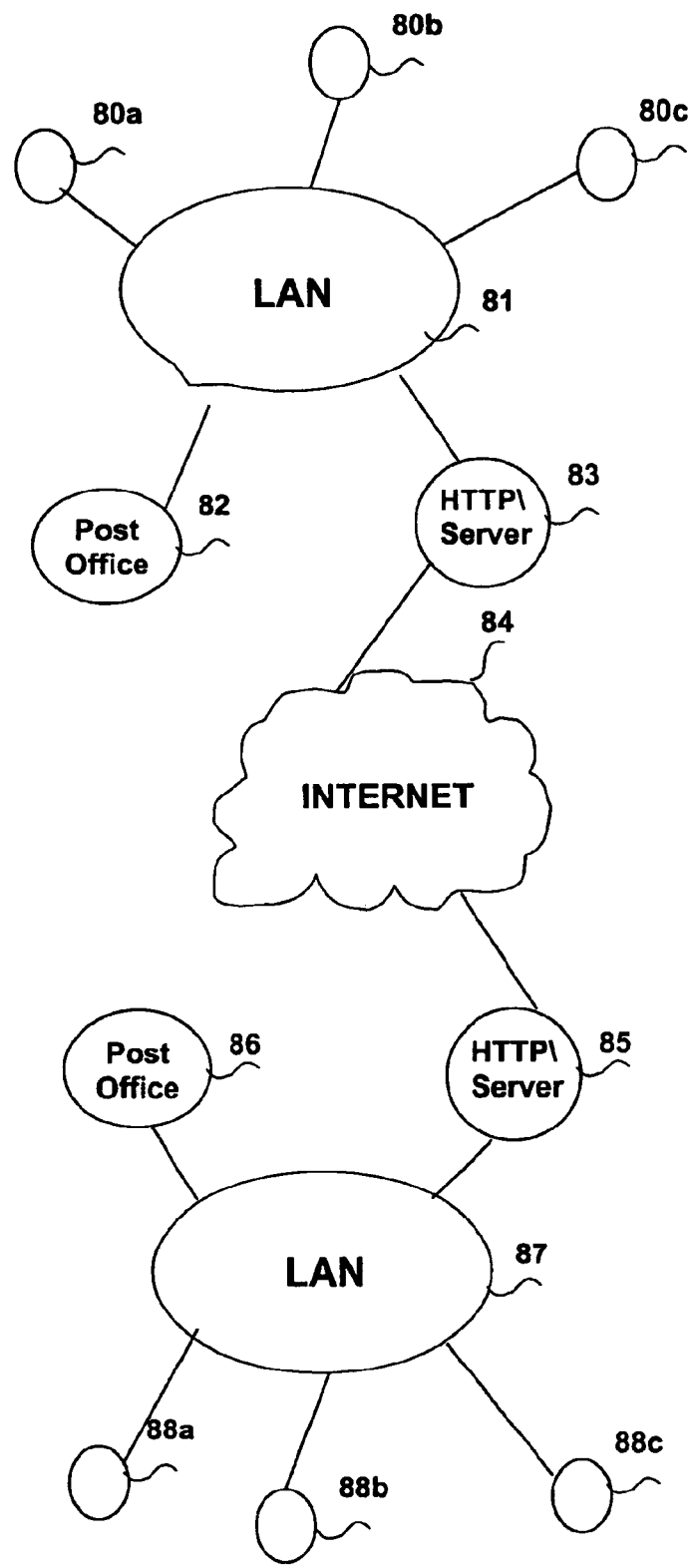
FIG. 8 is a schematic diagram of two LAN computer networks connected via the internet according to an embodiment of the present invention.

The operation of an e-mail communications system incorporating an attachment delayed-delivery module is explained with reference to FIG. 8, in which an e-mail communication with an attachment is transmitted from computer 80a to computer 88c via the Internet 84. Computers 80a, 80b, and 80c are connected together via LAN 81. Post office server 82 connects to LAN 81 for transmitting e-mail both within and outside the LAN network. A world wide web hyper text transport protocol (HTTP) server 83 (web server), or internet gateway, is also connected to the LAN 81 for facilitating communication between any of the computers 80a, 80b, and 80c with other computer systems via the internet 84. Likewise, computers 88a, 88b, and 88c are connected together through LAN 87, which is also connected to a post office server 86 and web server 85.

When a user stationed at computer 80a sends an e-mail communication having a message and one or more attachment files, an e-mail application program running on computer 80a performs initial formatting and then forwards the communication to the LAN 81 for transmission. This e-mail communication does not include any viewer applets, but may include an indicator that one or more viewer applets are available for transmisssion. The LAN receives the communication and forwards it to post office server 82. Post office server 82 first determines whether the e-mail is a local communication within the LAN network. When the e-mail is not a local communication, the e-mail communication is forwarded at the internet gateway 83 and reformatted according to a MIME or UUENCODE format for transmission along the internet.

The e-mail is then received at the destination internet gateway 85, reformatted, and forwarded to destination post office 86. A notification message is generated at the post office and transmitted along LAN 87 to destination computer 88c. When a user at the destination computer 88c elects to read the e-mail communication, the LAN 87 then forwards the e-mail communication directly to the destination computer. This e-mail communication includes at least one icon for the recipient to select to transmit viewer applets for viewing the one or more e-mail attachments.

The e-mail communications system at computer 80a then transmits one or more viewer applets corresponding to the respective one or more attachment files in the transmitted e-mail communication. The applets are transmitted along the LAN 81 to post office server 82. The applets are detected by a delayed delivery detector (not shown) and are temporarily stored at the post office server 82. After delivery of the e-mail communication, if a recipient selects an icon to request the one or more applets, a signal is transmitted by the recipient's e-mail communication system for detection by the delayed delivery detector. The post office server 82 then downloads the request viewer applets for transmission to the recipient. The viewer applet is then deleted from the post office.

In a second mode of operation, the e-mail that is transmitted to the recipient includes a "viewer applet icon." If the recipient of the e-mail communication is unable to view an attachment, the recipient can select the icon. This sends a return e-mail to the sender's address. The return e-mail has a code in the subject heading portion that prompts the sender's e-mail post office. Accordingly, the sender's e-mail post office intercepts this e-mail and then sends the viewer applet as an attachment to an e-mail communication to the requesting recipient.

As can be readily seen, the e-mail communications system viewer module and delayed-delivery module provide several advantages to the sender and receiver for transmitting and reviewing e-mail communications. The system allows for the most efficient use of the network by sending a viewer applet only when it is probable that the recipient would otherwise be unable to review an attachment. The viewer module can be configured in any of several possible modes of operation to balance network efficiency with the criticality of sending a viewer applet. With the delayed-delivery module, the e-mail communications system sends the viewer applet only when requested by the recipient, thereby saving network resources.

The foregoing disclosure of embodiments of the present invention and specific examples illustrating the present invention have been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claimed appended hereto, and by their equivalents.

What is claimed is:

1. A method for attaching viewer applets to e-mail communications comprising:

storing in memory a list of standard viewer applets that one or more recipients of an email communication have available for viewing attachments received in email communications;

receiving from a user at least one file to be included as an attachment to an e-mail communication; and automatically generating a prompt to include a viewer applet after receiving the at least one file from the user when the stored list of standard viewer applets does not include a corresponding viewer applet for the at least one file that was received.

2. The method for attaching viewer applets according to claim 1, further comprising the step of attaching a corresponding viewer applet for each selected file.

3. The method for attaching viewer applets according to claim 1, wherein the viewer applet is part of a user application software package, and the viewer applet corresponds to a file composed on the user application software package.

4. A method for attaching viewer applets to e-mail communications comprising:

storing at least one viewer program in a memory accessible to an e-mail communications interface for viewing, by one or more recipients of an email communication, attachments to e-mail communications;

receiving from a user at least one file to be included as an attachment to an e-mail communication; and automatically generating a prompt to include a viewer applet after receiving the at least one file from the user when the at least one file cannot be viewed by the at least one viewer program, wherein the corresponding viewer applet is attached after receiving a file to attach the viewer applet.

5. The method for attaching viewer applets according to claim 4, wherein the viewer applet is part of a user application software package, and the viewer applet corresponds to a file composed on the user application software package.

6. An e-mail communications system for attaching viewer applets to e-mail communications, comprising:

a user messaging interface for composing an e-mail communication including at least one attachment file wherein the attachment file is generated using a user application software package;

a viewer module for attaching a corresponding viewer applet for the at least one attachment file;

a viewer memory in communication with the viewer module, wherein the viewer memory includes at least one viewer program and a list of standard viewer applets for identifying the at least one attachment file for attaching the corresponding viewer applets thereto; and a user application interface for requesting and receiving viewer applets from user application software packages.

7. The e-mail communications system according to claim 6, wherein the user messaging interface provides a prompt to attach a corresponding viewer applet upon identification of at least one attachment file.

8. The e-mail communications system according to claim 7, wherein the viewer module attaches a viewer applet when selected by a user in response to the prompt.

9. The e-mail communications system according to claim 6, further comprising:

a viewer memory connected to the viewer module, the viewer memory for storing at least one viewer program for viewing attachment files from within an e-mail communications system, wherein the viewer module attaches a viewer applet when the at least one viewer program cannot view the at least one attachment file.

10. A method for configuring packages of e-mail attachment files for transmission as e-mail communications comprising:

creating a plurality of data structures, wherein each data structure groups together into a package a plurality of different user application files designated as attachments to an e-mail communication;

associating user application files designated from within user applications to data structures, such that each designated user application file is associated with a data structure;

determining whether to attach viewer applets to user application files by comparing the viewer applet to a list of available applets; and attaching corresponding viewer applets for user application files that have no associated viewer applets.

11. The method for configuring packages according to claim 10, further comprising attaching a corresponding viewer applet for each user application file that has no associated viewer applet.

12. The method for configuring packages according to claim 10, wherein determining whether to attach viewer applets to user application files further comprises generating a prompt to include a viewer applet after receiving the at least one user application file that has no associated applet, wherein the corresponding viewer applet is attached after receiving a response to the prompt.

13. The method for configuring packages according to claim 10, wherein determining whether to attach viewer applets to user application files that have no associated applet further comprises:

storing a list of standard viewer applets in a memory; and generating a prompt to include a viewer applet after receiving at least one user application file when the list does not include a corresponding viewer applet for the file, wherein the corresponding viewer applet is attached after receiving a response to the prompt.

14. The method for configuring packages according to claim 10, wherein determining whether to attach viewer applets to user application files further comprises:

storing at least one viewer program in a memory accessible to an e-mail communications interface for viewing attachments to e-mail communications; and generating a prompt to include a viewer applet after receiving at least one file when the at least one file cannot be viewed by the at least one viewer program, wherein the corresponding viewer applet is attached after receiving a user application file to attach the viewer applet.

15. The method for configuring packages according to claim 10, wherein the viewer applet is part of a user application software package, and the viewer applet corresponds to a file composed on the user application software package.

16. The method for configuring packages of e-mail attachment files according to claim 10, further comprising associating each data structure created with a name identifying the data structure as a package of attachments.

17. The method for configuring packages of e-mail attachment files according to claim 10, further comprising associating each designated user application file with a name identifying the user application file as an attachment file.

18. The method for configuring packages of e-mail attachment files according to claim 10, wherein a designation of an attachment file in the data structures is performed by linking to the associated user application file.

19. The method for configuring packages of e-mail attachment files according to claim 10, wherein a designation of an attachment file in the data structures is performed by linking to a copy of the associated user application file made at the time of designation.

20. A system for configuring packages of e-mail attachment files for transmission as e-mail communications, comprising:

a plurality of data structures, each data structure grouping together a plurality of different user application files designated as attachments to an e-mail communication;

a packaging file manager for designating user application files from within user applications to data structures, such that each designated application file is associated with a data structure;

a viewer module for attaching corresponding viewer applets for the designated attachment files;

a viewer memory in communication with the viewer module, wherein the viewer memory includes at least one viewer program and a list of standard viewer applets for identifying the designated files for attaching the corresponding viewer applets thereto; and an e-mail application user interface providing a listing of the data structures containing user application files generated by the packaging file manager during composition of an e-mail communication having attachments.

21. The e-mail communications system according to claim 20, wherein the user interface provides a prompt to attach a corresponding viewer applet upon identification of at least one attachment file.

22. The e-mail communications system according to claim 21, wherein the viewer module attaches a viewer applet when selected by a user in response to the prompt.

23. A method for transmitting a viewer applet corresponding to an attachment to an e-mail communication comprising:

transmitting an e-mail communication including at least one attachment to a destination e-mail address;

transmitting a viewer applet corresponding to the at least one attachment to an intermediate location along a network;

temporarily storing the viewer applet at the intermediate location; and completing transmission of the viewer applet in response to a request signal.

24. The method for transmitting a viewer applet according to claim 23, wherein the intermediate location is a post office e-mail server.

25. The method for transmitting a viewer applet according to claim 23, wherein the e-mail communication includes an icon to select transmission of the corresponding viewer applet.

26. The method for transmitting a viewer applet according to claim 23, further comprising deleting the viewer applet from the intermediate location after completing transmission.

27. A computer readable medium embodying a program of instructions executable by a computer for performing a method for attaching viewer applets to e-mail communications, the method comprising:

storing in memory a list of standard viewer applets that one or more recipients of an email communication have available for viewing attachments received in email communications;

receiving from a user at least one file to be included as an attachment to an e-mail communication; and automatically generating a prompt to include a viewer applet after receiving the at least one file from the user when the stored list of standard viewer applets does not include a corresponding viewer applet for the at least one file that was received.

28. The computer readable medium for performing a method for attaching viewer applets according to claim 27, further comprising the step of attaching a corresponding viewer applet for each selected file.

29. The computer readable medium for performing a method for attaching viewer applets according to claim 27, wherein the viewer applet is part of a user application software package, and the viewer applet corresponds to a file composed on the user application software package.

30. A computer readable medium embodying a program of instructions executable by a computer for performing a method for attaching viewer applets to e-mail communications, the method comprising:

storing at least one viewer program in a memory accessible to an e-mail communications interface for viewing, by one or more recipients of an e-mail communication, attachments to e-mail communications;

receiving from a user at least one file to be included as an attachment to an e-mail communication; and automatically generating a prompt to include a viewer applet after receiving the at least one file from the user when the at least one file cannot be viewed by the at least one viewer program, wherein the corresponding viewer applet is attached after receiving a file to attach the viewer applet.

31. The computer readable medium for performing a method for attaching viewer applets according to claim 30, wherein the viewer applet is part of a user application software package, and the viewer applet corresponds to a file composed on the user application software package.

32. A computer readable medium embodying a program of instructions executable by a computer for performing a method for configuring packages of e-mail attachment files for transmission as e-mail communications, the method comprising:

creating a plurality of data structures, wherein each data structure groups together into a package a plurality of different user application files designated as attachments to an e-mail communication;

associating user application files designated from within user applications to data structures, such that each designated user application file is associated with a data structure;

determining whether to attach viewer applets to user application files by comparing the viewer applet to a list of available applets; and attaching corresponding viewer applets for user application files that have no associated viewer applets.

33. The computer readable medium for performing a method for configuring packages according to claim 32, further comprising attaching a corresponding viewer applet for each user application file that has no associated viewer applet.

34. The computer readable medium for performing a method for configuring packages according to claim 32, wherein determining whether to attach viewer applets to user application files further comprises generating a prompt to include a viewer applet after receiving the at least one user application file that has no associated applet, wherein the corresponding viewer applet is attached after receiving a response to the prompt.

35. The computer readable medium for performing a method for configuring packages according to claim 32, wherein determining whether to attach viewer applets to user application files that have no associated applet further comprises:

storing a list of standard viewer applets in a memory; and generating a prompt to include a viewer applet after receiving at least one user application file when the list does not include a corresponding viewer applet for the file, wherein the corresponding viewer applet is attached after receiving a response to the prompt.

36. The computer readable medium for performing a method for configuring packages according to claim 32, wherein determining whether to attach viewer applets to user application files further comprises:

storing at least one viewer program in a memory accessible to an e-mail communications interface for viewing attachments to e-mail communications; and generating a prompt to include a viewer applet after receiving at least one file when the at least one file cannot be viewed by the at least one viewer program, wherein the corresponding viewer applet is attached after receiving a user application file to attach the viewer applet.

37. The computer readable medium for performing a method for configuring packages according to claim 32, wherein the viewer applet is part of a user application software package, and the viewer applet corresponds to a file composed on the user application software package.

38. The computer readable medium for performing a method for configuring packages of e-mail attachment files according to claim 32, further comprising associating each data structure created with a name identifying the data structure as a package of attachments.

39. The computer readable medium for performing a method for configuring packages of e-mail attachment files according to claim 32, further comprising associating each designated user application file with a name identifying the user application file as an attachment file.

40. The computer readable medium for performing a method for configuring packages of e-mail attachment files according to claim 32, wherein a designation of an attachment file in the data structures is performed by linking to the associated user application file.

41. The computer readable medium for performing a method for configuring packages of e-mail attachment files according to claim 32, wherein a designation of an attachment file in the data structures is performed by linking to a copy of the associated user application file made at the time of designation.

42. A computer readable medium embodying a program of instructions executable by a computer for performing a method for transmitting a viewer applet corresponding to an attachment to an e-mail communication, the method comprising:

transmitting an e-mail communication including at least one attachment to a destination e-mail address;

transmitting a viewer applet corresponding to the at least one attachment to an intermediate location along a network;

temporarily storing the viewer applet at the intermediate location; and completing transmission of the viewer applet in response to a request signal.

43. The computer readable medium for performing a method for transmitting a viewer applet according to claim 42, wherein the intermediate location is a post office e-mail server.

44. The computer readable medium for performing a method for transmitting a viewer applet according to claim 42, wherein the e-mail communication includes an icon to select transmission of the corresponding viewer applet.

45. The computer readable medium for performing a method for transmitting a viewer applet according to claim 42, further comprising deleting the viewer applet from the intermediate location after completing transmission.

\* \* \* \* \*